(12) United States Patent
Wakatani

(10) Patent No.: US 6,173,443 B1
(45) Date of Patent: Jan. 9, 2001

(54) METHOD OF COMPILING A LOOP

(75) Inventor: Akiyoshi Wakatani, Osaka (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/225,352

(22) Filed: Apr. 8, 1994

Related U.S. Application Data

(63) Continuation of application No. 07/610,148, filed on Nov. 6, 1990, now abandoned.

(30) Foreign Application Priority Data

Nov. 8, 1989 (JP) .................................... 1-290188

(51) Int. Cl.$^7$ ........................................... G06F 9/45
(52) U.S. Cl. .................................... 717/9; 717/5
(58) Field of Search ................. 395/700; 717/9, 717/5

(56) References Cited

U.S. PATENT DOCUMENTS

| | | | |
|---|---|---|---|
| 4,463,423 | * | 7/1984 | Potash et al. . |
| 4,567,574 | | 1/1986 | Saade et al. . |
| 4,642,765 | | 2/1987 | Cocke et al. . |
| 4,656,582 | * | 4/1987 | Chaitin et al. . |
| 4,656,583 | | 4/1987 | Auslander et al. . |
| 4,710,867 | * | 12/1987 | Watanabe . |
| 4,763,255 | * | 8/1988 | Hopkins et al. . |
| 4,773,007 | * | 9/1988 | Kanada et al. . |
| 4,802,091 | | 1/1989 | Cocke et al. . |
| 4,807,126 | * | 2/1989 | Gotou et al. . |
| 4,821,181 | | 4/1989 | Iwasawa et al. . |
| 4,833,606 | * | 5/1989 | Iwasawa et al. . |
| 4,953,084 | * | 8/1990 | Meloy et al. . |
| 4,991,088 | | 2/1991 | Kam . |
| 5,067,068 | | 11/1991 | Iwasawa et al. . |
| 5,121,498 | * | 6/1992 | Gilbert et al. . |
| 5,146,594 | * | 9/1992 | Iitsuka . |
| 5,151,991 | * | 9/1992 | Iwasawa et al. . |
| 5,202,995 | | 4/1993 | O'Brien . |

OTHER PUBLICATIONS

Sowell; "Programming in Asssembly Language Macro–11" pp 70–71.*
Struble; Assembler Language Programming: the IBM System/360 and 370; pp 156–184.*
W. Henhapl et al., "Parallel Loop Structures", *IBM Technical Disclosure Bulletin*, vol. 16, No. 4, at 1047–1049 (Sep. 1973).
R.E. Kizis, "Loopable Code Enhancement For An Ate Compiler", *IBM Technical Disclosure Bulletin*, vol. 25, No. 11B, at 6085–6089 (Apr. 1983).
A.K. Chandra, "Identifying Inner Loops of Programs", *IBM Technical Disclosure Bulletin*, vol. 18, No. 10 at 3514–3515 (Mar. 1976).
P.F. Carpenter et al., "Program Optimization Technique", *IBM Technical Disclosure Bulletin*, vol. 12, No. 6, at 891–893 (Nov. 1969).

(List continued on next page.)

\* cited by examiner

Primary Examiner—Krisna Lim
(74) Attorney, Agent, or Firm—Ratner & Prestia

(57) ABSTRACT

In a method of compiling, the contents of registers corresponding to data arrays having the same array names but having different indexes in sequence with the progress of a loop prior to loop return are moved, and only that having the smallest index among those which should be stored is stored. In this manner, the number of Load/Stores is reduced. Moreover, by unrolling loops, register moves may be omitted. Thus, by the application of the method of register allocation and changing the method of register allocation, execution of loops containing calculations of data arrays is speeded up by the extent of unnecessary memory accesses which have been eliminated.

5 Claims, 13 Drawing Sheets

```
LOAD  #A(0), reg0
LOAD  #A(1), reg1
LOOP_ENTRY I=1,N,1
ENTRY:
ADD   reg0, #1, reg1
LOAD  #A(I+1), reg2
ADD   reg2, #2, reg0
STORE reg0, #A(I-1)
MOVE  reg1, reg0
MOVE  reg2, reg1
LOOP_RETURN I=I+1, ENTRY
STORE reg1, #A(N)
```

OTHER PUBLICATIONS

F.E. Allen et al., "A Catalogue of Optimizing Transformations", IBM Thomas J. Watson Research Center, Yorktown Heights, New York.

R. Tarjan, "Depth–First Search and Linear Graph Algorithms", vol. 1, No. 2, at 146–160 (Jun. 1972).

J. Ferrante et al., "The Program Dependence Graph And Its Use In Optimization", *IBM Technical Report RC–10543*, at 1–33 (Jun. 1984).

M.S. Johnson et al., "Effectiveness of a Machine–level, Global Optimizer", *Proceedings of the SIGPLAN '86 Symposium On Compiler Construction*, at 99–108 (Jun. 1986).

D.S. Coutant et al., "Compilers for the New Generation of Hewlett–Packard Computers", *Hewlett–Packard Journal*, vol. 37, No. 1, at 4–18 (Jan. 1986).

A.V. Aho et al., *Principles of Compiler Design*, Addison–Wesley Publishing Co., Reading, US, at 412–417 and 454–471 (Apr. 1979).

Barrett et al., "Compiler Construction: Theory and Practice", Science Research Associates, Inc., Chicago, at 551–587 (1979).

Bauer et al., "Compiler Construction An Advanced Course", 2nd Edition, Springer–Verlag, New York, at 549–603 (1976).

David Gries, "Compiler Construction For Digital Computers", John Wiley & Sons, New York, at 376–411 (1971).

P.M. Lewis et al., "Compiler Design Theory", Addison–Wesley, MA at 559–569 (1976).

| ARRAY | REGISTER |
|-------|----------|
| B(I-1) | reg0 |
| B(I) | reg1 |
| B(I+1) | reg3 |
| A(I) | reg4 |

FIG. 3

```
LOOP_ENTRY I=1,N,1
ENTRY:
ADD reg0, reg1, reg2
ADD reg2, reg3, reg4
LOOP_RETURN I=I+1, ENTRY
```

FIG. 4

```
LOAD #B(0), reg0
LOAD #B(1), reg1
LOOP_ENTRY I=1,N,1
ENTRY:
ADD reg0, reg1, reg2
ADD reg2, reg3, reg4
LOOP_RETURN I=I+1, ENTRY
```

FIG. 5

```
LOAD #B(0), reg0
LOAD #B(1), reg1
LOOP_ENTRY I=1,N,1
ENTRY:
ADD reg0, reg1, reg2
LOAD #B(I+1), reg3
ADD reg2, reg3, reg4
LOOP_RETURN I=I+1, ENTRY
```

FIG. 6

```
LOAD #B(0), reg0
LOAD #B(1), reg1
LOOP_ENTRY I=1,N,1
ENTRY:
ADD reg0, reg1, reg2
LOAD #B(I+1), reg3
ADD reg2, reg3, reg4
STORE reg4, #A(1)
LOOP_RETURN I=I+1, ENTRY
```

FIG. 7

```
LOAD #B(0), reg0
LOAD #B(1), reg1
LOOP_ENTRY I=1,N,1
ENTRY:
ADD reg0, reg1, reg2
LOAD #B(I+1), reg3
ADD reg2, reg3, reg4
MOVE reg1, reg0
MOVE reg3, reg1
STORE reg4, #A(1)
LOOP_RETURN I=I+1, ENTRY
```

FIG. 8

```
LOAD #A(0), reg0
LOAD #A(1), reg1
LOOP_ENTRY I=1,N,1
ENTRY:
ADD reg0, #1, reg1
LOAD #A(I+1), reg2
ADD reg2, #2, reg0
STORE reg0, #A(I-1)
MOVE reg1, reg0
MOVE reg2, reg1
LOOP_RETURN I=I+1, ENTRY
STORE reg1, #A(N)
```

FIG. 9

| ARRAY | REGISTER |
|---|---|
| B(I−1) | reg0 |
| B(I) | reg1 |
| B(I+1) | reg3 |
| B(I+2) | reg0 |
| B(I+3) | reg1 |
| A(I) | reg4 |
| A(I+1) | reg4 |
| A(I+2) | reg4 |

FIG. 10

```
LOOP_ENTRY I=1,N,3
ENTRY:
LOOP BODY
LOOP_RETURN I=I+3, ENTRY
```

FIG. 11

```
LOOP_ENTRY I=1,N,3
ENTRY:
ADD reg0, reg1, reg2
ADD reg2, reg3, reg4
ADD reg1, reg3, reg2
ADD reg2, reg0, reg4
ADD reg3, reg0, reg2
ADD reg2, reg1, reg4
LOOP_RETURN I=I+3, ENTRY
```

FIG. 12

```
LOAD #B(0), reg0
LOAD #B(1), reg1
LOOP_ENTRY I=1,N,3
ENTRY:
ADD reg0, reg1, reg2
ADD reg2, reg3, reg4
ADD reg1, reg3, reg2
ADD reg2, reg0, reg4
ADD reg3, reg0, reg2
ADD reg2, reg1, reg4
LOOP_RETURN I=I+3, ENTRY
```

FIG. 13

```
LOAD #B(0), reg0
LOAD #B(1), reg1
LOOP_ENTRY I=1,N,3
ENTRY:
ADD reg0, reg1, reg2
LOAD #B(I+1), reg3
ADD reg2, reg3, reg4
ADD reg1, reg3, reg2
LOAD #B(I+2), reg0
ADD reg2, reg0, reg4
ADD reg3, reg0, reg2
LOAD #B(I+3), reg1
ADD reg2, reg1, reg4
LOOP_RETURN I=I+3, ENTRY
```

FIG. 14

```
LOAD #B(0), reg0
LOAD #B(1), reg1
LOOP_ENTRY I=1,N,3
ENTRY:
    ADD reg0, reg1, reg2
    LOAD #B(I+1), reg3
    ADD reg2, reg3, reg4
    STORE reg4, #A(I)

ADD reg1, reg3, reg2
    LOAD #B(I+2), reg0
    ADD reg2, reg0, reg4
    STORE reg4, #A(I+1)

ADD reg3, reg0, reg2
    LOAD #B(I+3), reg1
    ADD reg2, reg1, reg4
    STORE reg4, #A(I+2)

LOOP_RETURN I=I+3, ENTRY
```

FIG. 15

```
LOAD #A(0), reg0
LOAD #A(1), reg1
LOOP_ENTRY I=1,N,3
ENTRY:
    ADD reg0, #1, reg1
    LOAD #A(I+1), reg2
    ADD reg2, #2, reg0
    STORE reg0, #A(I-1)

ADD reg1, #1, reg2
    LOAD #A(I+2), reg0
    ADD reg0, #2, reg1
    STORE reg1, #A(1)

ADD reg2, #1, reg0
    LOAD #A(I+3), reg1
    ADD reg1, #2, reg2
    STORE reg2, #A(I+1)

LOOP_RETURN I=I+3, ENTRY
STORE reg0, #A(N)
```

FIG. 16

```
DO I=1,N
A(I)=B(I-1)+B(I)+B(I+1)
END DO
```

FIG. 17
PRIOR ART

```
DO I=1,N
A(I)=A(I-1)+1
A(I-1)=A(I+1)+2
END DO
```

FIG. 18
PRIOR ART

```
LOOP_ENTRY I=1,N,1
ENTRY:
LOAD #B(I-1), reg0
LOAD #B(1), reg1
ADD reg0, reg1, reg2
LOAD #B(I+1), reg3
ADD reg2, reg3, reg4
STORE reg4, #A(I)
LOOP_RETURN I=I+1, ENTRY
```

FIG. 19
PRIOR ART

```
LOOP_ENTRY I=1,N,1
ENTRY:
LOAD #A(I-1), reg0
ADD reg0, #1, reg1
STORE reg1, #A(1)
LOAD #A(I+1), reg2
ADD reg2, #2, reg3
STORE reg3, #A(I-1)
LOOP_RETURN I=I+1, ENTRY
```

FIG. 20
PRIOR ART

METHOD OF COMPILING A LOOP

This application is a continuation of application Ser. No. 07/610,148 filed Nov. 6, 1990, now abandoned.

BACKGROUND OF THE INVENTION

The present invention relates to a computer implemented method of compiling computer program loops containing calculations dealing with data arrays.

Prior art methods of compiling computer programs will be explained using program examples. A variety of compiling methods are well known in the prior art. For example A. Aho and J. Ullman, Principles of Compiler Design, Addison-Wesley Pub. Co., pp. 557–60, discloses a FORTRAN H compiler and a C compiler. Both illustrate the basic structural features of a compiler including lexical and syntactic analysis, code generation and optimization.

FIG. 17 is the FORTRAN coding for program example 1, FIG. 18 is the FORTRAN coding for program example 2, FIG. 19 is the dummy object coding for program example 1, and, FIG. 20 is the dummy object coding for program example 2. Such dummy object coding is well known in the prior art. For example, W. Barrett and J. Couch, Compiler Construction Theory and Practice, Science Research Assocs., Inc. pp 563–69, illustrates the use of dummy object code to describe to others in the art their algorithms. See also U.S. Pat. No. 4,719,867, Watanabe.

The programming sequences shown in FIGS. 19 and 20 each being with an Initial Loop Setting instruction, namely:

LOOP ENTRY x=y, z, w

In this instruction, the index is x, the initial value is y, the final value is z and the increment is w.

A Loading Register instruction is also included, namely:

LOAD #x, reg y

In this instruction, the memory content of location x is loaded into register y.

A first Addition instruction:

ADD reg x, reg y, reg z performs the following operation:

reg z=reg x+reg y.

while a second Addition instruction:

Add reg x, #y, reg z performs the following operation:

reg z=reg x+#y.

A Storing Register instruction:

STORE reg x, #y results in the contents of register x being stored in memory y.

An Inter-Register Move instruction:

MOVE reg x, reg y results in the contents of register x being copied into register y.

In a Post Processing instruction:

LOOP_RETURN x=x+y, z the value of X is added to the value of Y and program execution skips to z. An appropriate value of X results in an exiting of the loop.

If the exemplary computer program which is shown in FIG. 17 (Program example 1) is compiled by well known prior art methods, the result is as in FIG. 19. As shown, loop execution is initialized. Next, at the start of the loop body, B(I−1) and B(I) are loaded and added, then B(I+1) is also added. Finally, the result is stored in A(I) and loop return is executed. If the exemplary computer program which is shown in FIG. 18 (Program example 2) is compiled by well known prior art methods, the result is as in FIG. 20. As shown, loop execution is initialized. Then, at the start of the loop body, A(I−1) is loaded and added to instant value 1. The result is stored in A(I). Then A(I+1) is also loaded and added to instant value 2. Finally, the result is stored in A(I−1) and loop return is executed.

As related above, in accordance with prior art methods, the same data is loaded and stored a plurality of times when the index values are different. For example, in the dummy coding for program example 1, the value for B(3) is loaded as B(I=1) when I=2, as B(I) when I=3, and, as B(I−1) when I=4. Furthermore, in the dummy coding for program example 2, the value for A(3) is stored as A(I) when I=3, and as A(I−1) when I=4; and loaded as A(I−1) when I=4 and as A(I+1) when I=2. Thus, in well known prior art methods of compiling, there is more accessing of memory than is necessary.

SUMMARY OF THE INVENTION

The subject invention relates to a computer implemented method of compiling a computer program. When compiling loop statements containing calculations dealing with data arrays, steps are included for finding data arrays within the program and finding locations of loops. Loops are composed of three parts consisting of loop entry (which is the pre-processing before the results of compiling the said loop statements enters the loop) the loop body (which is the repetitive calculation portion), and the loop return (which is the post-processing portion to repeat the loop). Steps are included where, of the data arrays, those with different array names and different indexes are respectively allocated to separate registers. Steps are included where, for the data arrays corresponding to arrays other than that having the highest index, the loading from memory to the registers are undertaken prior to loop entry. Steps are included where, for the data array having the highest index, the loading from memory of the corresponding said register is undertaken in the loop body. Steps within the loop body wherein the contents of the registers corresponding to the data arrays are moved to the registers corresponding to the data arrays having a different index from the data arrays. Steps are included so that when it is necessary to store the data array in memory, the data array having the smallest index within the loop body is stored in memory. Steps are also to store all other data arrays after the loop return.

Thus, the present invention relates to a method of compiling characterized by not undertaking moves to the registers but unrolling the loop by an integer multiple of the maximum difference between the indexes of the data arrays within the loop.

By utilizing the above configurated method of register allocation to change the method of register allocation, execution of loop statements including calculations of data arrays can be expedited by the number of unnecessary memory accesses which have been eliminated. Also, through the unrolling technique, register moves can be omitted.

BRIEF DESCRIPTION OF THE DRAWING

FIG. 3 is a table which illustrates the correspondence between register numbers and array locations in accordance with the first method of compiling for program example 1.

FIG. 4 illustrates dummy coding which is prepared in accordance with the correspondences shown in FIG. 3.

FIG. 5 illustrates the dummy coding which is included in FIG. 4 and further with load instructions executed prior to loop entry.

FIG. 6 illustrates the dummy coding which is included in FIG. 5 with a further load instruction executed within the loop.

FIG. 7 illustrates the dummy coding which is included in FIG. 6 with a store instruction executed within the loop.

FIG. 8 is the coding for the results of compilation using the first method of compiling for program example 1.

FIG. 9 is the coding for the results of compilation using the first method of compiling for program example 2.

FIG. 10 is a table which illustrates the correspondence between register number and array locations in accordance with the second method of compiling for program example 1.

FIG. 11 illustrates dummy coding which is prepared by unrolling in accordance with the correspondences shown in FIG. 10.

FIG. 12 illustrates dummy coding which is prepared by using register in accordance with the correspondences shown in FIG. 10.

FIG. 13 illustrates the dummy coding which is included in FIG. 12 and further with load instructions executed prior to loop entry.

FIG. 14 illustrates the dummy coding which is included in FIG. 13 with a further load instruction executed within the loop.

FIG. 15 is the coding for the results of compilation using the second method of compiling for program example 1.

FIG. 16 is the coding for the results of compilation using the second method of compiling for program example 2.

FIG. 17 is the FORTRAN coding for program example 1.

FIG. 18 is the FORTRAN coding for program example 2.

FIG. 19 is an example of prior art dummy coding for program example 1.

FIG. 20 is an example of prior art dummy coding for program example 2.

DETAILED DESCRIPTION OF THE INVENTION

The subject invention will be explained, in the same manner as for prior art, utilizing program example 1 (FIG. 17) and program example 2 (FIG. 18).

Figure 1:
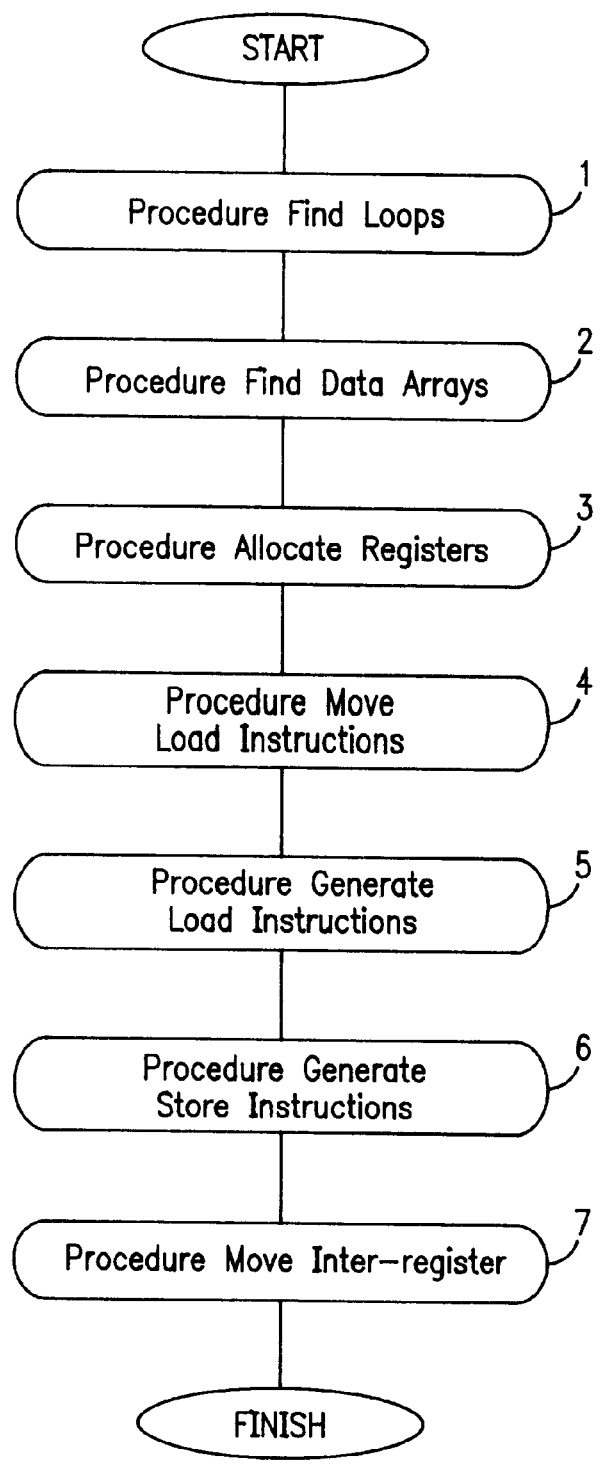
FIG. 1 is a flow chart diagram of the subject invention's first method of compiling.
Figure 2:
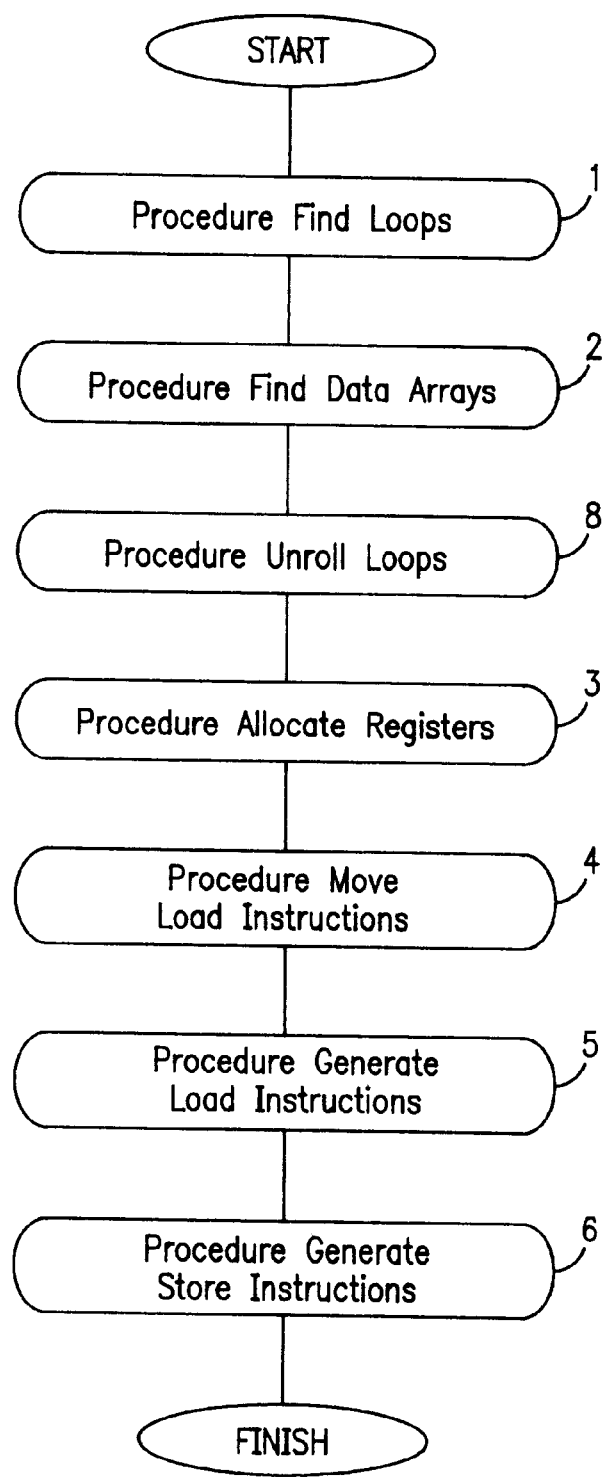
FIG. 2 is a flow chart diagram of the subject invention's second method of compiling.

FIG. 1 is a flow chart diagram of the first method of compiling of the subject invention. FIG. 2 is a flow chart diagram of the second method of compiling of the subject invention. FIGS. 3 through 7 are figures to explain the application of the first method of compiling to program example 1, and, FIG. 8 is the coding resulting from the compilation using the first method of compiling for program example 1. FIG. 9 is the coding resulting from the compilation using the second method of compiling for program example 1, FIGS. 10 through 14 are figures to explain the application of the second method of compiling for program example 1, FIG. 15 is the coding resulting from the compilation using the second method of compiling for program example 1, and, FIG. 16 is the coding resulting from the compilation using the second method of compiling for program example 2.

The first method of compiling, as shown in FIG. 1, consists of seven procedures therefor Principals of Compiler Design, pages 1–25 and 557–60 is incorporated herein by reference for its teachings on the construction of compilers including lexal analysis, syntax analysis, intermediate code generation, code optimization and code generation". Several of the procedures may be individually well known in the prior art. First, in procedure 1, Find Loop, a portion in the source program which is a loop is found. Principles of Compiler Design, pp. 444–45, is illustrative of the methods to detect loops. Then in procedure 2, Find Data Arrays, data arrays referred to in the loop is found. Principles of Compiler Design, pp. 203–04, 265, and 296–303, is illustrative of how compilers translate, parse and perform syntactical analysis of data arrays during the compiling process. Procedure 3 follows, Register Allocation, where those data arrays having different array names and different indexes are allocated, respectively, to different registers. Principles of Compiler Design, pp. 533–37, is illustrative of the allocation and assignment process performed within a compiler. In procedure 4, Move Load Instruction, the range of indexes are obtained and all those other than that having the greatest index are loaded prior to the loop. Principles of Compiler Design, pp. 297–300 is illustrative of this requirement and how it is addressed within a compiler. Next, in procedure 5, Generate Load Instruction, a load instruction is generated within the loop for that having the greatest index. Moreover, in procedure 6, Store Instruction Generation, the store instruction for only that having the smallest index is generated within the loop. For all others, the store instruction is generated after the loop return. Finally, in procedure 7, Inter-register Move, the register contents for those having different indexes are moved to other registers.

On the other hand, the second method of compiling, as shown in FIG. 2, is composed of seven procedures. First procedure 1, Find Loop, and procedure 2, Find Data Arrays, are the same as for the first method of compiling. Then procedure 8, Loop Unrolling, obtains the range of indexes used within the loop and unrolls the loop by an integer multiple of the range. Principles of Compiler Design, pp. 471–72, is illustrative of this technique. See also P. Lewes II, D. Rosenkraste, and R. Stearns, Compiler Design Theory, Addison-Wesley Pub. Co., pp. 564–65. The remaining procedures 3 through 6 are the same as in the first method of compiling.

Program examples will be processed in accordance with the procedures of the first and second methods of compiling. First, program example 1 will be compiled using the first method of compiling. In procedure 1, Find Loop, and procedure 2, Find Data Arrays, the location of the loop and data arrays referenced therein, (B(I+1), B(I), B(I−1), A(I)), are found. When registers are allocated to this data in procedure 3, Allocate Registers, the result is as in FIG. 3. Then, if dummy coding is prepared using these registers, the result is as in FIG. 4. Next, if we seek the index range in accordance with procedure 4, Move Load Instructions, the index range of the result is I−1 through I+1. Then Move Load Instructions loads B(I−1), B(I) before the loop. Compiler Design Theory, pp. 564–65, is illustrative of this principle. See also Principles of Compiler Design, pp. 414–15. The resulting dummy coding, is illustrated in FIG. 5. When in procedure 5, Generate Load Instructions, load instructions are generated for B(I+1) and dummy coding is prepared, the result is as in FIG. 6. Then, in procedure 6, Generate Store Instructions, store instructions for A(I) is generated within the loop body and dummy coding is prepared, the result is as in FIG. 7. Finally, when procedure 7, Inter-register Move, is executed, the result is as in FIG. 8.

In this manner, for program example 1, the number of loads within the loop is reduced from three to one.

Next, for program example 2, most procedures are undertaken in the same manner as for program example 1. However, since A has been stored twice within the loop, in procedure 6, Generate Store Instructions, only the store instruction for that having the smaller index will be generated with the loop. This dummy coding is shown in FIG. 9.

Next, let us consider the case of compiling said program example 1 with the second method of compiling. In this case the range of indexes is I−1 through I+1, so that in procedure 8, Loop Unrolling, the loop is unrolled three times (FIG. 11), and in procedure 3, Allocate Registers, registers are allocated to the data arrays (FIG. 10). At this time, B(I−1) and B(I+2), B(I) and B(I+3), and, A(I), A(I+1) and A(I+2) are sharing registers. The dummy coding using these registers is shown in FIG. 12. Then, procedure 4, Move Load Instructions, is executed (FIG. 13) and procedure 5, Generate Load Instructions, is executed (FIG. 14). Finally, procedure 6, Generate Store Instructions, is executed. The results shown in FIG. 15.

By unrolling the loop in this manner, the registers which will be used at the start of the next loop body have been set at the time of loop return, and copying between registers becomes unnecessary. That is to say, looking at the case of the program example 1, at the end of the loop body when I=3, B(5) is set in reg 0, B(6) is set in reg 1 and B(7) is set in reg 3 and the register settings required at the start of the next I=6 loop (reg 0=B(5), reg 1=B(6) and reg 3=B(7)) have been attained.

Finally, the same process can be undertaken for program example 2; with results shown in FIG. 16.

In this manner, via the first and second method of compiling, by merely changing the manner of utilizing the registers, it is possible to eliminate unnecessary accesses to the memory. Further, these embodiments can be applied to any computer having registers.

As stated above, the subject invention, by applying a method of register allocation, can speed up the execution of loops containing calculation of data array by the extent of eliminating unnecessary memory accesses. Also, through the unrolling technique, register moves can be omitted.

What is claimed:

1. A computer implemented method of reducing execution time of a computer program which includes a loop, said loop including a loop body portion in which repeated calculations occur, a loop entry portion situated prior to said loop body portion and a loop exit portion situated after said loop body portion wherein calculations which access a plurality of data value storage means included within at least one data array are performed in said loop, each of said data value storage means addressed by an index value, said method including the steps of:

assigning each one of said plurality of data value storage means to a respective one of a plurality of registers;

creating at least one computer program instruction which loads data from a memory to ones of said plurality of registers corresponding to other than a specified data value storage means of said plurality of data value storage means addressed by a largest index value, said at least one computer program instruction created for computer execution prior to loop entry;

creating a computer program data loading instruction which loads data from the memory to said register of said plurality of registers corresponding to said data value storage means addressed by the largest index value, said further computer program instruction created for computer execution within the loop body;

creating a computer program data transfer instruction within the loop body, which transfers the contents of one of said plurality of registers corresponding to one of said plurality of data value storage means to another one of said plurality of registers corresponding to another one of said plurality of data value storage means; and creating at least one computer program memory storage instruction if it is necessary to store contents of said data value storage means in the memory, wherein said at least one computer program memory storage instruction is created so that data in the data value storage means having the smallest index value is stored in the memory during the loop body, and data in all other of said data value storage means are stored in the memory after the loop return.

2. A computer implemented method of reducing execution time of a computer program which includes a loop, said loop including a loop body portion in which repeated calculations occur, a loop entry portion situated prior to said loop body portion and a loop exit portion situated after said loop body portion wherein calculations which access a plurality of data value storage means included within at least one data array are performed in said loop, each of said data value storage means addressed by an index value, said method including the steps of:

unrolling said loop by an integer multiple of the greatest difference between a smallest index value and a largest index value occurring within the loop;

assigning each one of said plurality of data value storage means to a respective one of a plurality of registers;

creating at least one computer program instruction which loads data from a memory to ones of said plurality of registers corresponding to other than a specified data value storage means of said plurality of data value storage means addressed by a largest index value, said at least one computer program instruction created for computer execution prior to loop entry;

creating a computer program data loading instruction which loads data from the memory to said register of said plurality of registers corresponding to said data value storage means addressed by the largest index value, said further computer program instruction created for computer execution within the loop body; and creating at least one computer program memory storage instruction if it is necessary to store contents of said data value storage means in the memory, wherein said at least one computer program memory storage instruction is created so that data in the data value storage means having the smallest index value is stored in the memory during the loop body, and data in all other of said data value storage means are stored in the memory after the loop return.

3. A computer implemented method of reducing execution time of a computer program which includes a loop, said loop including a loop body portion in which repeated calculations occur, a loop entry portion situated prior to said loop body portion and a loop exit portion situated after said loop body portion wherein calculations which access a plurality of data value storage means included within at least one data array are performed in said loop, each of said data value storage means addressed by an index value, said method including the steps of:

assigning each one of said plurality of data value storage means to a respective one of a plurality of registers;

creating at least one computer program instruction which loads data from a memory to ones of said plurality of registers corresponding to other than a specified data value storage means of said plurality of data value storage means addressed by a largest index value, said at least one computer program instruction created for computer execution prior to loop entry to reduce the number of loading operations in the loop body;

creating a computer program data loading instruction which loads data from the memory to said register of said plurality of registers corresponding to said data value storage means addressed by the largest index value, said further computer program instruction created for computer execution within the loop body;

creating a computer program data transfer instruction within the loop body, which transfers the contents of one of said plurality of registers corresponding to one of said plurality of data value storage means to another one of said plurality of registers corresponding to another one of said plurality of data value storage means to reduce the number of loading operations in the loop body; and creating at least one computer program memory storage instruction if it is necessary to store contents of said data value storage means in the memory, wherein said at least one computer program memory storage instruction is created so that data in the data value storage means having the smallest index is stored in the memory during the loop body, and data in all other of said data value storage means are stored in the memory after the loop return.

4. A computer implemented method of reducing execution time of a computer program which includes a loop, said loop including a loop body portion in which repeated calculations occur, a loop entry portion situated prior to said loop body portion and a loop exit portion situated after said loop body portion wherein calculations which access a plurality of data value storage means included within at least one data array are performed in said loop, each of said data value storage means addressed by an index value, said method including the steps of:

assigning each one of said plurality of data value storage means to a respective one of a plurality of registers;

creating at least one computer program instruction which loads data from a memory to ones of said plurality of registers corresponding to other than a specified data value storage means of said plurality of data value storage means addressed by a largest index value, said at least one computer program instruction created for computer execution prior to loop entry;

creating a computer program data loading instruction which loads data from the memory to said register of said plurality of registers corresponding to said data value storage means addressed by the largest index value, said further computer program instruction created for computer execution within the loop body;

creating a computer program data transfer instruction within the loop body, which transfers sequentially the contents of specified ones of said plurality of registers corresponding to specified ones of said plurality of data value storage means to a next one of said plurality of registers corresponding to another one of said plurality of data value storage means; and creating at least one computer program memory storage instruction if it is necessary to store contents of said data value storage means in the memory, wherein said at least one computer program memory storage instruction is created so that data in the data value storage means having the smallest index value is stored in the memory during the loop body, and data in all other of said data value storage means are stored in the memory after the loop return.

5. The computer implemented method according to claim 4, wherein the computer program data transfer instruction:

(a) transfers the contents of a first one of said plurality of registers corresponding to a first one of said plurality of data value storage means to a second one of said plurality of registers corresponding to second one of said plurality of data value storage means, and (b) transfers the contents of a third one of said plurality of registers corresponding to a third one of said plurality of data value storage means to the first one.

* * * * *